United States Patent [19]

Dittakavi et al.

[11] Patent Number: 4,466,801
[45] Date of Patent: Aug. 21, 1984

[54] ELECTRONIC LEARNING AID WITH MEANS FOR REPEATING AN ELEMENT OF NONSPOKEN SOUND

[75] Inventors: Ashok Dittakavi; Albert J. Olson, both of Lubbock, Tex.

[73] Assignee: Texas Instruments Incorporated, Dallas, Tex.

[21] Appl. No.: 381,988

[22] Filed: May 25, 1982

[51] Int. Cl.³ .............................................. G09B 7/00
[52] U.S. Cl. ..................................... 434/335; 381/52; 434/201; 434/169
[58] Field of Search ....................... 434/335, 338–341, 434/205, 319–321, 156, 157, 169, 201, 176; 179/1 SM, 1 SF

[56] References Cited

U.S. PATENT DOCUMENTS 4,308,017 12/1981 Laughon et al. .................. 434/169
4,337,375 6/1982 Freeman ............................ 434/313

*Primary Examiner*—Richard C. Pinkham
*Assistant Examiner*—Leo P. Picard
*Attorney, Agent, or Firm*—Robert D. Marshall, Jr.; Leo N. Heiting; Melvin Sharp

[57] ABSTRACT

The electronic learning aid of the present invention includes a scanning instrument for reading coded indicia which control the sound generated by the apparatus. In accordance with the present invention the coded indicia may be arranged to indicate a sub-part of nonspoken sound to be recalled from speech memory within the apparatus. In addition, a repeat command may also be entered via the scanning instrument. Upon entry of a repeat command, which includes a number indicating the number of repeats to be performed, the electronic learning aid repeatively generates sound corresponding to the stored element of nonspoken sound. This invention advantageously enables such an electronic learning aid to generate relatively long sound effects from short coded indicia.

3 Claims, 4 Drawing Figures

ELECTRONIC LEARNING AID WITH MEANS FOR REPEATING AN ELEMENT OF NONSPOKEN SOUND

BACKGROUND OF THE INVENTION

This invention relates to electronic educational products and more specifically to speaking electronic educational products.

In recent years there have become available a number of electronic educational learning aid products, an early example of these being the Little Professor* mathematics learning aid. This product presents mathematical problems to an operator by means of a visual display and the operator enters attempted solutions to the problem via a keyboard. The product then indicates to the operator the correctness of his response. In addition there has appeared a series of learning aids which have the additional capability of communicating to the operator by means of electronically synthesized speech. Examples of these include the Speak & Spell*, Speak & Math*, and Speak & Read* electronic learning aids.
*trademark of Texas Instruments Incorporated.

More recently there has been disclosed in Freeman U.S. Pat. No. 4,337,375, entitled "Manually Controllable Data Reading Apparatus for Speech Synthesizers", issued June 29, 1982, a new type of system which has the capability of communicating to the operator by means of electronically synthesized speech. This system is distinguished by the fact that the words that are to be spoken are identified to the system by the operator through the use of an optical code reading instrument. The code, which may comprise a bar code of the type that has been used by grocers on certain of their products, may typically appear on the pages of a book below a line of corresponding printed text. Thus, an operator, who may typically be a child seeking to gain reading facility, when he encounters words or phrases that he does not recognize, may pass the optical reading instrument over the corresponding coded material thereby causing the system to speak the word or phrase. It will be seen therefore that such a system comprises a powerful learning aid in that it will selectively provide for the student verbalization of those words and phrases which he does not recognize in the printed text. It will be appreciated that a learning aid with such capability may have application to students of a wide variety of ages including preschool students.

A problem, particularly with students of younger ages, is to provide systems which will not only be effective in imparting the educational content, but which will also provide an enjoyable experience so as to maintain the interest of the student. Thus it is advantageous to provide a code reading speaking learning aid of the type described above, which has a plurality of modes of operation so as to provide the student with variety and stimulation in the educational experience.

In certain circumstances it is particularly advantageous to provide such an electronic learning aid with a means for generating sound effects. The electronic learning aid may be provided with prestored speech data in order to cause the speech synthesizer to generate the required sound effects. However, the memory space required for storing all of the desired sound effects quickly becomes prohibitively large. The desired sound effects may be divided into a series of elements of nonspoken sound which may be called in a sequence determined by a particular sound effect code. Such a system greatly reduces the required storage space within the apparatus, however such a system may not provide sufficient variation of sound effects and may require extremely long codes in order to generate an extended sound effect.

OBJECT OF THE INVENTION

It is an object of the present invention to provide an electronic learning aid with an optical code reading instrument which may generate sound effects as well as speech from properly presented code.

In accordance with the present invention, a particular optical code instructs the apparatus to generate a predetermined element of nonspoken sound and a further portion of optical code instructs the apparatus to repeat generation of this nonspoken sound.

In accordance with a further embodiment of the present invention, the latter element of optical code includes a repeat number, whereby the appartus repeats generation of the element of nonspoken sound a number of times equal to the repeat number.

In accordance with a further embodiment of the present invention, the optical code is provided by a printed bar code. This printed bar code having coded portions corresponding to elements of sound and repeat commands, including the repeat number, are provided in association with a picture corresponding to the desired sound effect indicated by the optical code.

BRIEF DESCRIPTION OF THE DRAWINGS

These and other objects and embodiments of the present invention will become clear from the following description of the invention taken in conjunction with the figures in which.

DETAILED DESCRIPTION OF THE PREFERRED EMBODIMENT

Figure 1:
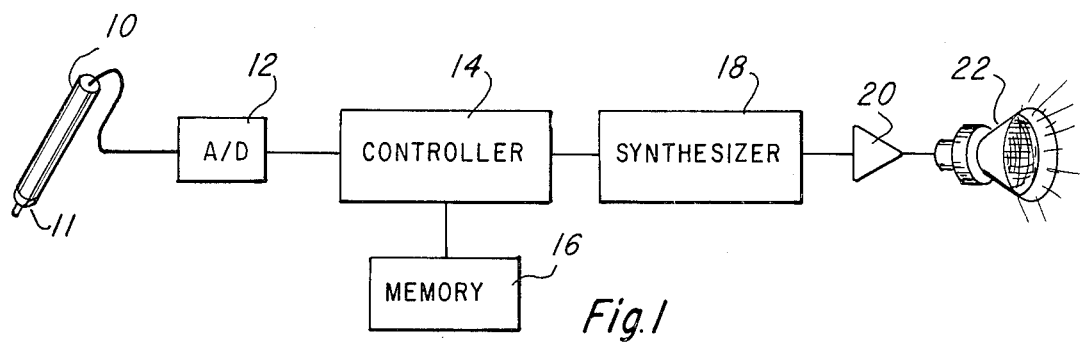
FIG. 1 illustrates a block diagram of the preferred embodiment of the electronic learning aid of the present invention.

With reference to FIG. 1 there is shown a block diagram of the claimed system. The input to the system comprises an electro-optical wand 10 which is used to scan and detect bar code located on the medium to be read. Illumination of the bar code, typically by means of infra-red energy, and sensing of the energy reflected from the bar code is accomplished by means of a head 11. Such electro-optical wands are well known in the art and typically comprise means for generating the illuminating typically comprise means for generating the illuminating energy, as well as means for detecting and converting the reflections from the bar code to electrical energy. A particularly convenient mechanism for transmitting the illuminating energy and the reflected energy is that disclosed in copending U.S. patent application Ser. No. 308,346, filed 10/5/81 by Frazier. In the preferred embodiment of the invention the bar code to be read by the wand will have one of two colors, black or white, although in other embodiments it may be preferrable to use multicolor bar code. In the case of two color bar code the electrical signal output by wand 10 is analog in nature, but basically has two discrete levels corresponding to the two colors comprising the bar code.

The output of the scanning wand 10 is digitized in analog to digital converter 12. Functionally, A/D converter 12 amounts to an everdriven amplifier which serves to square up the analog waveform from wand 10 so that the output of A/D converter 12 is a well defined digital signal having one of two discrete levels.

The output of A/D converter 12 is coupled to an input of controller 14, which in the preferred embodiment comprises a model TMS 7040 8-bit microcomputer available from Texas Instruments Incorporated. Controller 14 utilizes information derived from the bar code by wand 10 to control the operation of the system as claimed.

To accomplish spoken or other auditory communication to the user of the system, controller 14 in the preferred embodiment provides digital auditory information to synthesizer 18 which may comprise a model TMS 5220A voice synthesis processor also available from Texas Instruments Incorporated. Synthesizer 18 utilizes the digital input information to synthesize an analog sound waveform which is in turn provided to amplifier 20. Amplifier 20 in turn provides the analog signal at a suitable level to speaker 22 for generation of the audible information.

In the preferred embodiment, at least some of the digital data used by synthesizer 18 is stored in the form af allophones. As is well known by those skilled in the art, allophones are basic units of speech which may be combined in suitable sequences so as to provide the sounds, words, phrases and the like that are useful in human communication. The digital data which is used by synthesizer 18 to synthesize the individual allophone sounds are stored in memory 16 which in the preferred embodiment comprises a read only memory (ROM).

Various types of information are available from the bar code located on the printed medium such as a page of a book. An example of a portion of such a page is allustrated in FIG. 2. When the wand is passed over the bar code 26 the system will enunciate the phrase comprised of the words 24. The portion of the bar code underlying each of these individual words serves to identify the sequence of allophones that is required in each case to produce the corresponding word. It will be noted however that the two lines of bar code illustrated each has a considerable portion to the left of the area in which the words of the phrase appear. This additional bar code serves in part to provide prosody information for the corresponding phrase. Such prosody information serves to indicate a desired pitch variation and duration for the individual allophones. In the absence of such prosody information the sequence of allophones when assembled would result in relatively monotonic speech. With the use of the prosody information, the speech is produced in a more familiar and pleasing fashion.

Figure 2:
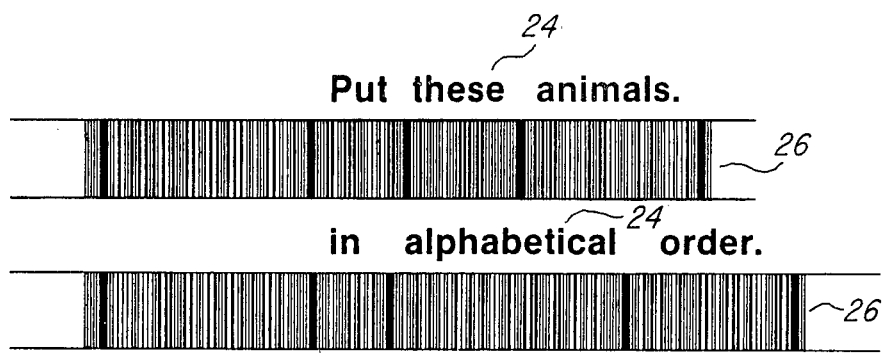
FIG. 2 illustrates an example of optical bar code employed to generate phrases.

Further, the bar code located to the left of the region where the words appear also provides information about the nature of the activity. The system illustrated in FIG. 1 has various modes of operation, each of which is initiated by information derived from the pages of the book itself. This mode information which is derived from the left portions of the bar code 26 illustrated in FIG. 2 is utilized by controller 14 to direct appropriate functioning of the system. Thus in the example of FIG. 2, when the operator passes the wand over the bar code the system utilizes the prosody and allophone identification data in the bar code to access the digital information for the appropriate allophones from ROM 16, and to modify this data in accordance with the prosody information before passing the digital signals to synthesizer 18 for sound synthesis. In addition the bar code is informed controller 14 to place itself in a mode wherein the operator is required to identify a plurality of characters in an alphabetical order. As will be subsequently described, other modes of operation are possible.

The acquisition of prosody and allophone identification from scanned bar code is disclosed in U.S. patent application Ser, Nos. 381,986 and 381,987 filed the same date as the present application.

Figure 3:
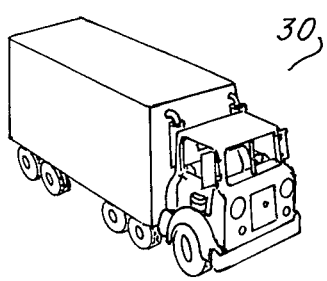
FIG. 3 illustrates a preferred embodiment of an optical bar code with associated picture employed for generating sound effects.
Figure 3:
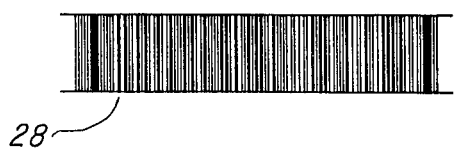

FIG. 3 illustrates a sound effect bar code 28 having a picture 30 associated therewith. Bar code 28 differs from bar codes 26 illustrated in FIG. 2 in a number of ways. Firstly, bar code 28 begins with a special code which instructs the apparatus that the following coded indicia correspond to a sound effect mode. Sound effects are produced by listing coded indicia corresponding to elements of nonspoken sound stored within memory 16. That is, controller 14 recognizes particular coded indicia from bar code 28 corresponding to elements of nonspoken sound. Upon this recognition controller 14 addresses memory 16 to recall speech data corresponding to these elements of nonspoken sound. This speech data is them transmitted to synthesizer 18 in order to synthesize this string of elements of nonspoken sound. These elements of nonspoken sound may be termed sound effect allophones and are processed in a manner similar to spoken allophones.

In order to improve the quality of the sound effects which may be produced in this manner, and in order to enhance the amount of sound effect which may be produced from a particular length bar code, the preferred embodiment of the present invention includes coded indicia in addition to the coded indicia corresponding to the elements of nonspoken sound. Firstly, bar code 28 provides prosody data for each element of nonspoken sound or sound effect allophone within bar code 28. Thus the pitch, duration, volume and intonation of each of the elements of nonspoken sound is set by the prosody data associated with that element of nonspoken sound. In the preferred embodiment, the printed bar code 28 includes coded prosody data followed by coded data corresponding to the element on nonspoken sound repeated for each element of nonspoken sound.

In addition to the above described prosody data, bar code 28 includes indicia corresponding to a repeat command. This repeat command is employed in a manner which will be more fully described below in order to cause the previously entered data corresponding to the element of nonspoken sound to be repeated. In the preferred embodiment, this repeat command also includes a repeat number. This repeat number is employed to determine the number of times that the previously entered element of nonspoken sound is repeated. Employing such a system it is possible to generate a fairly lengthy sound effect with a relatively short bar code.

FIG. 3 illustrates a typical association of bar code 28 with picture 30. In the above case bar code 28 may correspond to the engine sound of a large truck such as illustrated in picture 30. Therefore picture 30 illustrates the sound effect coded in bar code 28.

Figure 4:
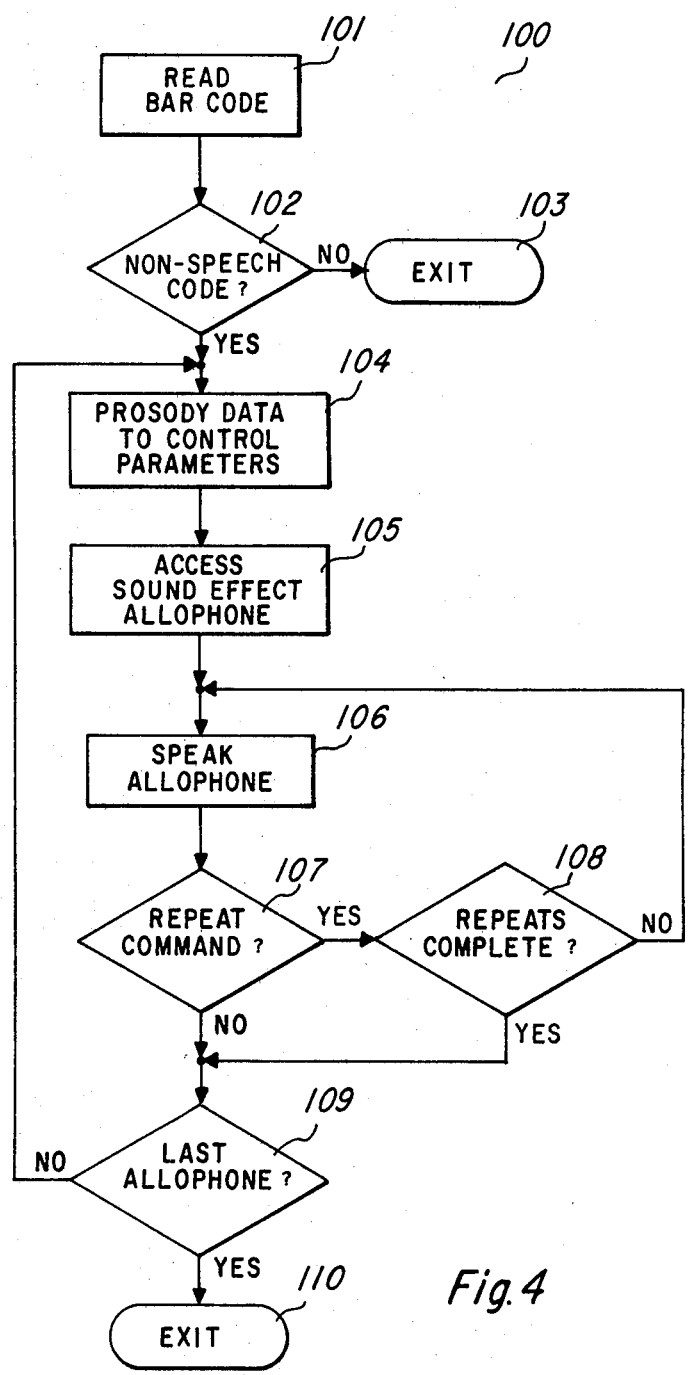
FIG. 4 is a flow chart illustrating the operation of the electronic learning aid of the present invention when generating non-speech sounds.

FIG. 4 is a flow chart illustrating the operation of the electronic learning aid of the present invention when in the sound effect mode. FIG. 4 illustrates only the general steps within such a sound effect mode and is not intended to illustrate the detailed processes within the apparatus which performs the sound effect mode. Once the design choice of controller 14 and synthesizer 18 has been made, then one skilled in the art would be capable of providing the proper design detail to enable the electronic learning aid to operate in the manner illustrated in FIG. 4.

FIG. 4 illustrates sound effect program 100. Program 100 is begun via reading of the bar code (processing block 101). This is accomplished by having the student user pass head 11 of electro-optical wand 10 across bar code 28. This caused electro-optical wand 10 to generate a signal corresponding to the light and dark areas of bar code 28. After conversion to digital signals in A/D converter 12, these signals are applied to controller 14. Controller 14 is constructed to recognize these signals and to take appropriate action, specifically to transfer appropriate data from memory 16 to synthesizer 18 in order to generate the required sounds.

Program 100 first tests to determine whether the data within bar code 28 corresponds to non-speech code (decision block 102). As described above, one portion of bar code 28 is a particular code which changes the mode of operation of controller 14 into a sound effects mode. In the event that the code for sound effect mode is not found, then program 100 is inapplicable. Therefore program 100 is exited via exit block 103.

In the event that bar code 28 does correspond to sound effect data then the next following coded indicia comprise one or more sets of prosody data followed by coded data corresponding to a sound effect allophone. Controller 14 operates upon the first received of these associated pairs to convert the prosody data received from A/D converter 12 into the proper control parameters for operation of synthesizer 18 (processing block 104). At the same time or shortly thereafter, controller 14 then accesses the particular speech data stored within memory 16 corresponding to the particular sound effect allophone received and transmits this data to synthesizer 18 (processing block 105). Controller 14 then operates to cause synthesizer 18 to speak the particular speech data in accordance with the control parameters transmitted by controller 14 (processing block 106).

Program 100 next checks to determine whether the particular paired prosody data and indicia corresponding to a sound effect allophone was followed by a repeat command (decision block 107). In the event that such a repeat command followed the sound effect allophone then program 100 tests to determine whether the number of repeats indicated by the repeat number in this repeat command has been completed (decision block 108). If the number of repeats indicated by the repeat command has not been acomplished then program 100 returns to processing block 106 and again speaks the allophone. In the event that either no repeat command was involved or that the number of repeats corresponding to the repeat number in the repeat command have been complete then program 100 tests to determine whether the last allophone has been completed (decision block 109). In the event that the last allophone has not been completed, then program 100 returns to processing block 104. Controller 14 then produces the control parameters corresponding to the next received prosody data indicia and then recalls from memory 16 the speech data corresponding to the next received indicia of a sound effect allophone. This loop is continued until the last allophone is spoken. In such event, the sound effect has been completed and program 100 is exited via exit block 110.

What is claimed is:

1. An electronic learning aid comprising:
   a scanning means for reading coded indicia, said coded indicia including first coded indicia corresponding to an element of nonspoken sound and second coded indicia indicative of a repeat command and a repeat number selected from a plurality of repeat numbers;
   a control means for selecting speech synthesis data corresponding to said element of nonspoken sound upon reading first coded indicia and for repeat selection of said speech synthesis data, upon reading said second coded indicia a number of times corresponding to said repeat number; and
   a speech synthesis means for generating a sound effect corresponding to said speech synthesis data selected by said control means.

2. An electronic learning aid as claimed in claim 1, wherein:
   said scanning means includes optical reading means for reading printed bar code.

3. An electronic learning aid as claimed in claim 2, wherein;
   said printed bar code includes at least one first coded indicia and at least one second coded indicia having a picture associated therewith corresponding to said sound effect.

* * * * *